(12) United States Patent
Duerbaum et al.

(10) Patent No.: US 6,721,191 B2
(45) Date of Patent: Apr. 13, 2004

(54) RESONANT CONVERTER

(75) Inventors: Thomas Duerbaum, Langerwehe (DE);
Reinhold Elferich, Aachen (DE)

(73) Assignee: Koninklijke Philips Electronics N.V.,
Eindhoven (NL)

( * ) Notice: Subject to any disclaimer, the term of this patent is extended or adjusted under 35 U.S.C. 154(b) by 0 days.

(21) Appl. No.: 10/140,667

(22) Filed: May 8, 2002

(65) Prior Publication Data

US 2002/0181259 A1 Dec. 5, 2002

(30) Foreign Application Priority Data

May 9, 2001 (DE) .......................... 101 22 534

(51) Int. Cl.[7] .................. H02M 3/335; H02M 7/217
(52) U.S. Cl. .......................... 363/16; 363/127
(58) Field of Search ...................... 363/16, 17, 19, 363/20, 21.02, 95, 98, 127, 21.03, 34

(56) References Cited

U.S. PATENT DOCUMENTS

| | | | | | |
|---|---|---|---|---|---|
| 4,500,949 A | * | 2/1985 | Prete | ............................ | 363/28 |
| 4,525,774 A | * | 6/1985 | Kino et al. | .................. | 363/17 |
| 4,716,488 A | * | 12/1987 | Segger | ....................... | 361/88 |
| 5,394,017 A | * | 2/1995 | Catano et al. | ............... | 307/66 |
| 5,701,237 A | * | 12/1997 | Yang | ........................... | 363/20 |
| 5,973,939 A | * | 10/1999 | Tan | ............................. | 363/97 |
| 6,304,461 B1 | * | 10/2001 | Walker | ....................... | 363/17 |
| 6,490,175 B2 | * | 12/2002 | Raets et al. | .................. | 363/17 |

* cited by examiner

*Primary Examiner*—Rajnikant B. Patel

(57) ABSTRACT

The invention relates to a resonant converter (1) which has multiple outputs (7a, 7b) and contains a transformer (4) with a primary winding (5) and at least two secondary windings (6a, 6b) having different winding directions. In this way it is possible to design as cost-effectively as possible a resonant converter with multiple outputs, two of which can be controlled separately from each other.

19 Claims, 7 Drawing Sheets

RESONANT CONVERTER

FIELD OF THE TECHNOLOGY

The invention relates to a resonant converter.

In converters of this type a d-c voltage carried on the input side is first chopped and the a-c voltage thus produced in the form of a chopped d-c voltage is processed by means of circuit parts containing resonant circuit elements.

Transformers, particularly ones that produce an electrical separation of the input and output side of the converter, are used for this purpose. With converters of this type it is possible to manufacture inexpensive, small, lightweight power supply units/switched-mode power supplies, which can advantageously be used in consumer electronics appliances such as set top boxes, satellite receivers, television sets, computer monitors, video recorders and compact audio systems. In these applications there is often a need for converters that generate multiple output voltages on multiple converter outputs from one input d-c voltage.

BACKGROUND AND SUMMARY OF THE INVENTION

The object of the invention is to design a resonant converter having multiple outputs, two of which are adjustable separately from one another, that is as cost-effective as possible.

The object is achieved in that the converter has multiple outputs and contains a transformer having a primary winding and at least two secondary windings with different winding directions.

With this approach it is possible to provide a converter, which has only one diode (power semiconductor element) in each branched output coupled to a secondary winding; the number of diodes needed in the branched outputs is therefore reduced to a minimum. Two output voltages or output currents generated from one input voltage can be adjusted separately from one another and therefore adjusted to preset values with improved tolerances compared to conventional resonant converters; the converter according to the invention is moreover capable of generating multiple preset output voltages and one or more preset output currents simultaneously. Furthermore, a more cost-effective transformer can be used over a wide output voltage range, since the groups of secondary windings with different winding directions may have different ratios of output voltage generated to number of turns in the associated secondary winding.

If the transformer has a first group of secondary windings with one or more secondary windings having a first winding direction and a second group of secondary windings with one or more secondary windings having a second winding direction, secondary windings can be electrically separated from one another or electrically coupled to one another, the secondary windings in the latter case being coupled, in particular, to a ground potential. The secondary windings may be connected in series, tappings then being provided between the secondary windings.

The resonance frequency of the resonant converter is determined by inductive and capacitive elements of the resonant converter, which take the form of one or more capacitors and/or coils and the transformer main inductance together with the transformer leakage inductances. The resonant frequency of the converter can be adjusted to the desired value, in particular, through additional separate coils, even where this value cannot be set solely by means of a specific transformer design having a preset main inductance and preset leakage inductances.

In one embodiment of the resonant converter, switching elements are used to chop an input d-c voltage and a feedback loop with a regulating circuit serves for regulating two output voltages. Here the frequency and the duty cycle of the chopped input d-c voltage are provided as regulating control variables, it being sufficient to provide a measuring signal for the regulating circuit from just one of the associated output voltages for just one group of identically-wound secondary windings at a time. In the case of the converter according to the invention it is sufficient to couple each of the secondary windings of the transformer to the converter outputs by way of one diode and one output filter each. In particular, different ratios of output voltage to number of turns can be provided in respect of associated secondary windings having different winding directions, so that the distribution of the overall output power generated by the converter can be influenced by presetting these ratios accordingly. At the same time a further converter output voltage range is feasible using simple transformer designs.

BRIEF DESCRIPTION OF THE DRAWINGS

The invention will be further described with reference to examples of embodiments shown in the drawings, to which, however, the invention is not restricted. In the drawings.

DETAILED DESCRIPTION

Figure 1:
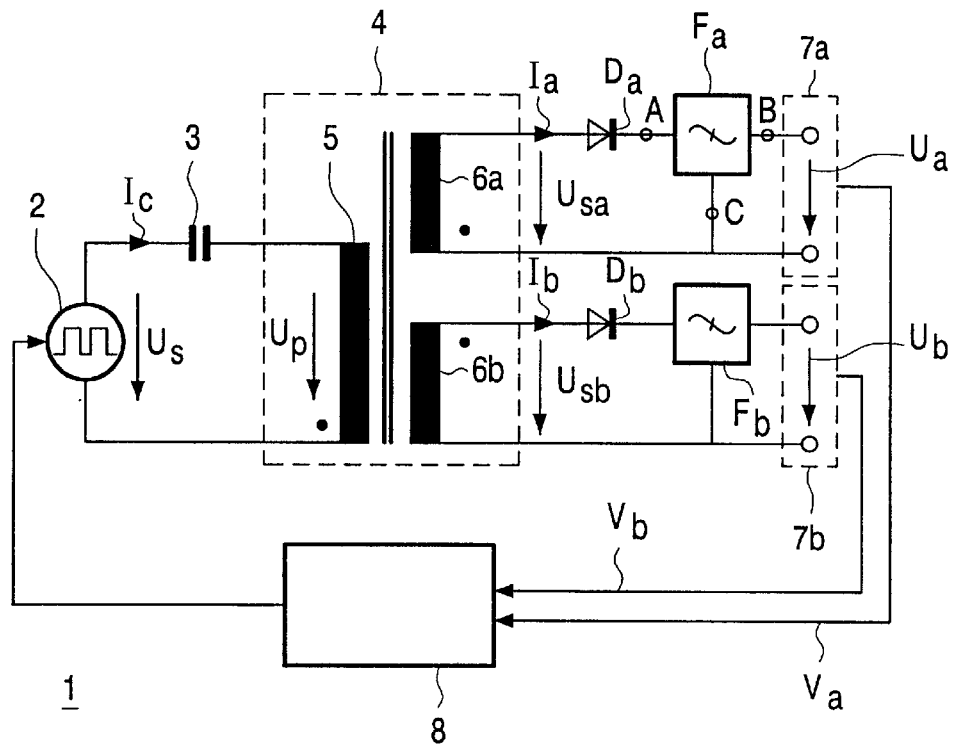
FIG. 1 shows a resonant converter having two outputs, according to the invention.

The circuit arrangement shown in FIG. 1 shows a resonant converter 1 having an inverter 2, which is here designed as chopper and converts a d-c voltage (not shown) into an a-c voltage, i.e. in this case a chopped d-c voltage Us. The inverter 2 is coupled by a capacitor 3 to a transformer 4, which has a primary winding 5 and two secondary windings 6a and 6b. The secondary windings 6a and 6b have different winding directions, so that given a positive voltage Up on the primary winding 5 the voltage Usa generated on the secondary winding 6a is also positive, whereas given a positive voltage Up, the dropping voltage Usb on the secondary winding 6b is negative. The transformer 4 has a common transformer core both for the primary winding 5 and for the secondary windings 6a and 6b. A current flowing through the capacitor 3 in the primary winding 5 is denoted by Ic.

The secondary winding 6a is coupled by way of a diode Da and an output filter Fa to an output 7a, on which an output voltage Ua is dropping. The secondary winding 6b is connected by a diode Db and a filter Fb to an output 7b, on which an output voltage Ub is dropping. The converter 1 furthermore contains a feedback loop with a regulating circuit 8, which is coupled on the input side to the outputs 7a and 7b of the converter 1 and on the output side to the inverter 2. The regulating circuit 8 sets the frequency and the duty cycle of the voltage Us supplied by the inverter 2 as a function of the voltages Ua and Ub present on the outputs 7a and 7b, in order to regulate the output voltages Ua and Ub to desired predefined voltage values.

In the resonant converter 1, the capacitor 3, the main inductance and the leakage inductances of the transformer 4 constitute resonant circuit elements, which are induced to oscillate by the a-c voltage Us and produce a corresponding behavior of the current Ic flowing into the circuit part that has the resonant circuit elements and of the voltage Up dropping on the primary winding. In the case of positive voltage values of the voltage Up, a current Ia is generated, which flows through the diode Da to the filter Fa for the time during which, in this operating state, the voltage Usa exceeds the voltage present on the input of the filter Fa minus the diode forward voltage over the diode Da. If the voltage Up on the primary winding 5 has positive voltage values, no current is generated by the secondary winding 6b, since in this case the diode Db blocks.

In the event of negative voltage values of the voltage Up there is a positive voltage Usb present on the secondary winding 6b and a negative voltage Usa on the secondary winding 6a. In this case a current Ib is generated, which flows from the secondary winding 6b through the diode Db to the output filter Fb for the period of time during which, in this operating state, the voltage Usb exceeds the voltage present on the input of the filters Fb minus the diode forward voltage over the diode Db.

Figure 2:
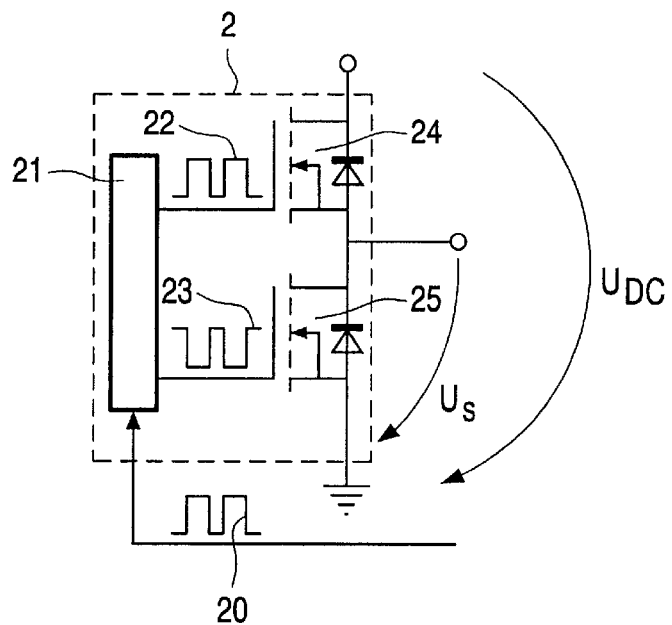
FIG. 2 shows a half-bridge circuit for the resonant converter, according to the invention.

FIG. 2 shows a design variant of the inverter or chopper 2 in FIG. 1. A control signal 20, here represented by a pulse sequence, generated by the regulating circuit 8, is fed to a half-bridge drive circuit 21, which from the control signal 20 generates control signals 22 and 23 for the switching elements 24 and 25, which form a half-bridge circuit. The switching elements 24 and 25 are designed as MOSFET transistors. The control signals 22 and 23 are fed to gate connections (control connections) of the transistors 24 and 25. The inverter 2 converts a d-c voltage UDC into the a-c voltage Us by alternately switching the switching elements 24 and 25 on and off. The d-c voltage UDC is generated, in power supply units/power packs/chargers, for example, from the a-c voltage of an a-c voltage mains by means of rectifiers.

Figure 3A:
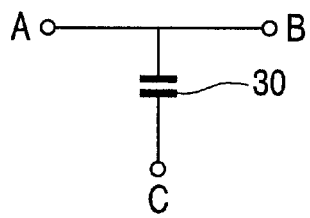
FIGS. 3A, 3B and 3C show various output filters for the resonant converter, according to the invention.
Figure 3B:
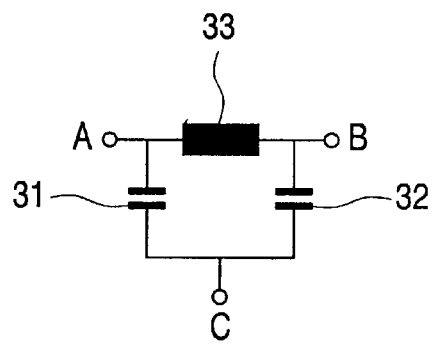
Figure 3C:
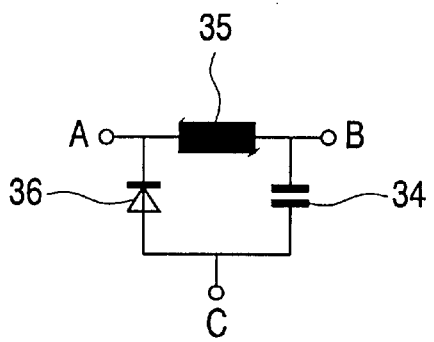

FIGS. 3A to 3C show design variants of the output filters Fa and Fb of the resonant converter 1. These have a connection A, which is connected to the diodes Da and Db. The connections B and C are connected to the outputs 7a and 7b of the converter 1. The filter according to FIG. 3A only contains a capacitor 30. The output filter according to FIG. 3B contains two capacitors 31 and 32 and an inductance 33. The output filter according to FIG. 3C contains a capacitor 34, an inductance 35 and a diode 36.

Figure 4:
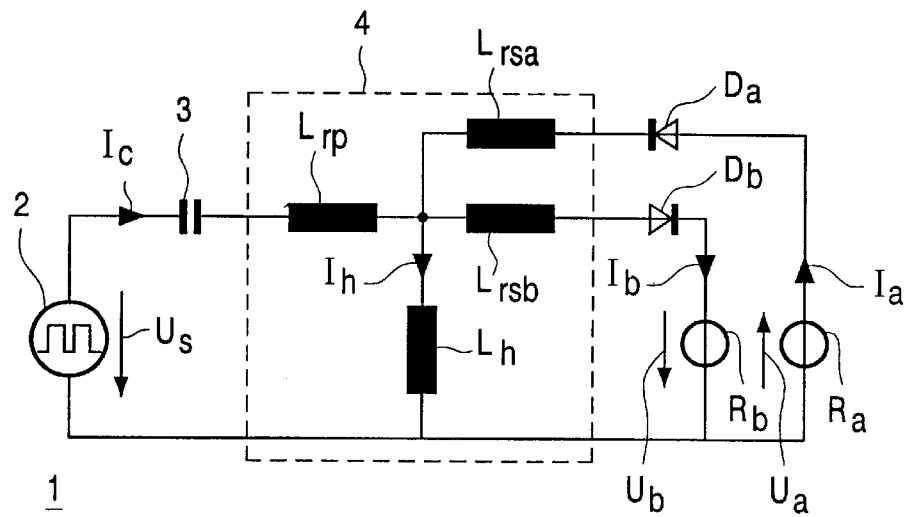
FIG. 4 shows an equivalent circuit diagram for the resonant converter illustrated in FIG. 1, FIG. 5 to FIG. 7 show voltage and current characteristics in the resonant converter illustrated in FIG. 4, FIG. 8 to FIG. 10 show various embodiment options for a resonant converter, according to the invention.

FIG. 4 shows an equivalent circuit diagram for the resonant converter 1 in FIG. 1, in which the transformer 4 has been replaced by a transformer equivalent circuit diagram. Here the electrical function of the transformer 4 may essentially be represented by a primary-side leakage inductance Lrp, a main inductance Lh, a secondary-side leakage inductance Lrsa for the secondary winding 6a and a secondary-side leakage inductance Lrsb for the secondary winding 6b. The filters Fa and Fb are here assumed as ideal and not shown, as is the regulating circuit 8. Loads Ra and Rb are connected to outputs 7a and 7b of the converter 1.

Figure 5:
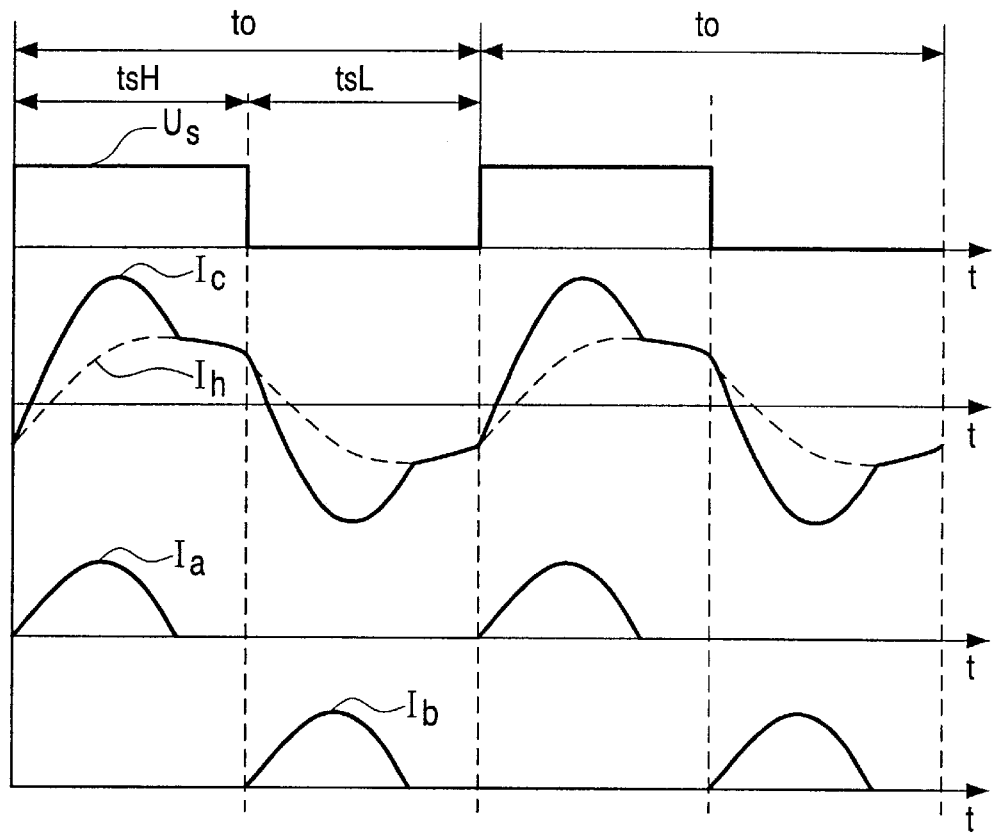
Figure 6:
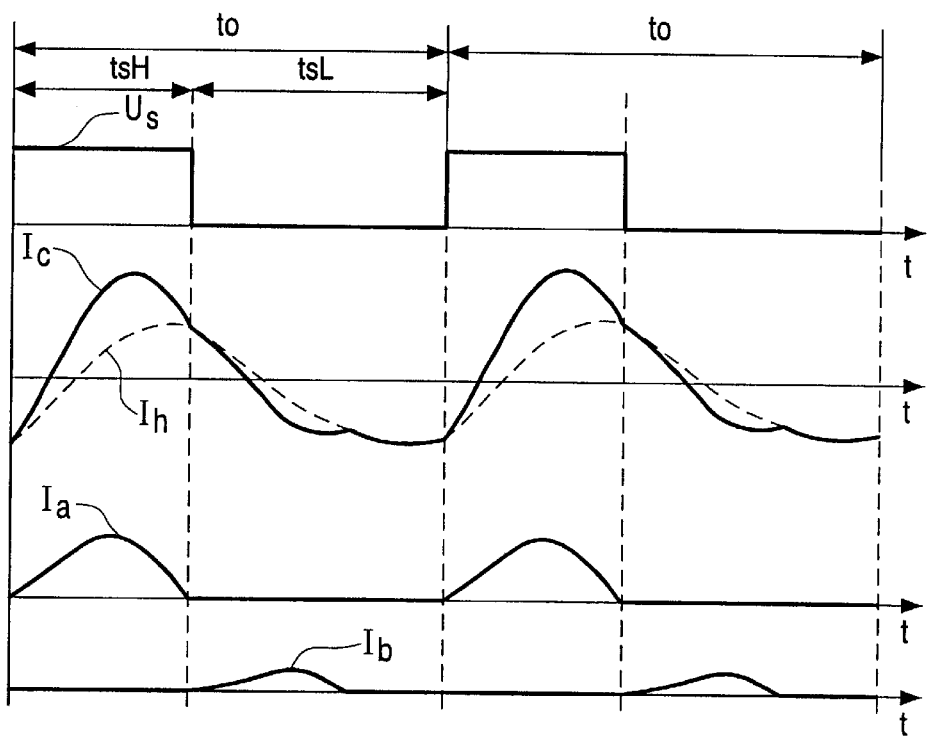
Figure 7:
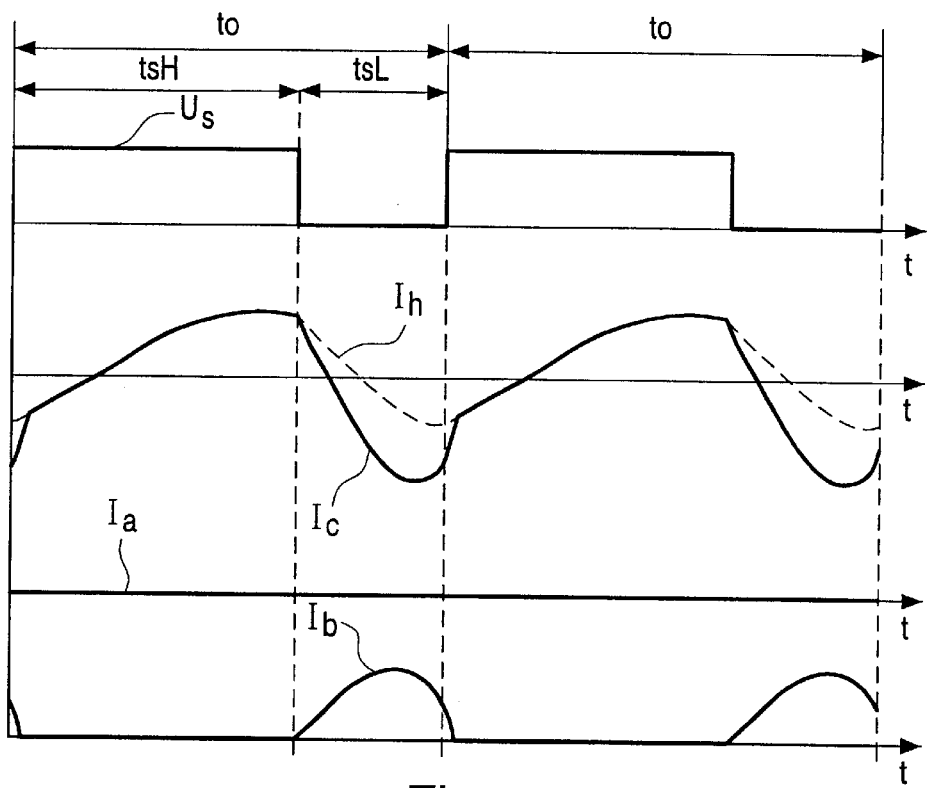

FIGS. 5 to 7 show how it is possible to regulate the output voltages Ua and Ub by adjusting the frequency f0 and/or the cycle period t0=1/f0 and the duty cycle of the a-c voltage Us. The duty cycle is here determined by the period of time tsH and tsL, the upper switching element 24 being switched on and the lower switching element 25 being switched off during a period of time tsH, and the upper switching element 24 being switched off and the lower switching element 25 being switched on during a period of time tsL. The duty cycle is obtained as tsH/t0. The characteristics of the a-c voltage Us, of the current Ic through the capacitor 3, of the current Ih through the main inductance Lh of the transformer 4, of the current Ia delivered by the secondary winding 6a and of the current Ib delivered by the secondary winding 6b are represented for each of two periods of time t0. All winding ratios in the underlying example according to the equivalent circuit in FIG. 4 are in each case assumed to be one; in addition, Lrsa is here equal to Lrsb.

FIG. 5 shows the operating state in which the frequency f0=1/t0 is set to 1.47 times fr, fr being the resonant frequency of the converter 1 and being approximately determined as $$fr = \frac{1}{2\pi}\sqrt{\frac{1}{C(3)[Lrp + Lh]}}$$

C(3) being the capacitance of the capacitor 3. In the operating instance according to FIG. 5 the duty cycle is selected as 50%. In this operating state the current characteristics of Ia and Ib are generated with virtually identical half-waves during the time periods tsH and tsL respectively. In the operating state according to FIG. 6 the frequency f0=1/t0 is increased 1.53 times fr. The duty cycle is reduced to 40%. The characteristic of the current Ia has remained virtually identical to the operating state in FIG. 5. The characteristic of the current Ib now has half-waves with reduced amplitude, so that the power carried to the output 7b by the secondary winding 6b is reduced. FIG. 7 shows an operating instance with a frequency f0=1/t0 equal to 1.55 times fr and a duty cycle of 65%. In this operating instance the current Ia is essentially reduced to zero and the amplitude of the half-waves of Ib increased in comparison to FIG. 6, so that in this operating instance the secondary winding 6a carries no power to the output 7a but, in comparison to FIG. 6, secondary winding 6b carries increased power to output 7b.

The examples of operating states according to FIGS. 5 to 7 show that with the converter circuit according to the invention a highly variable adjustment to different loads of the various converter outputs is possible. With the converter according to the invention it is possible, in particular, to achieve small tolerances of the output voltages even in the case of low output voltages and high output currents.

Figure 8:
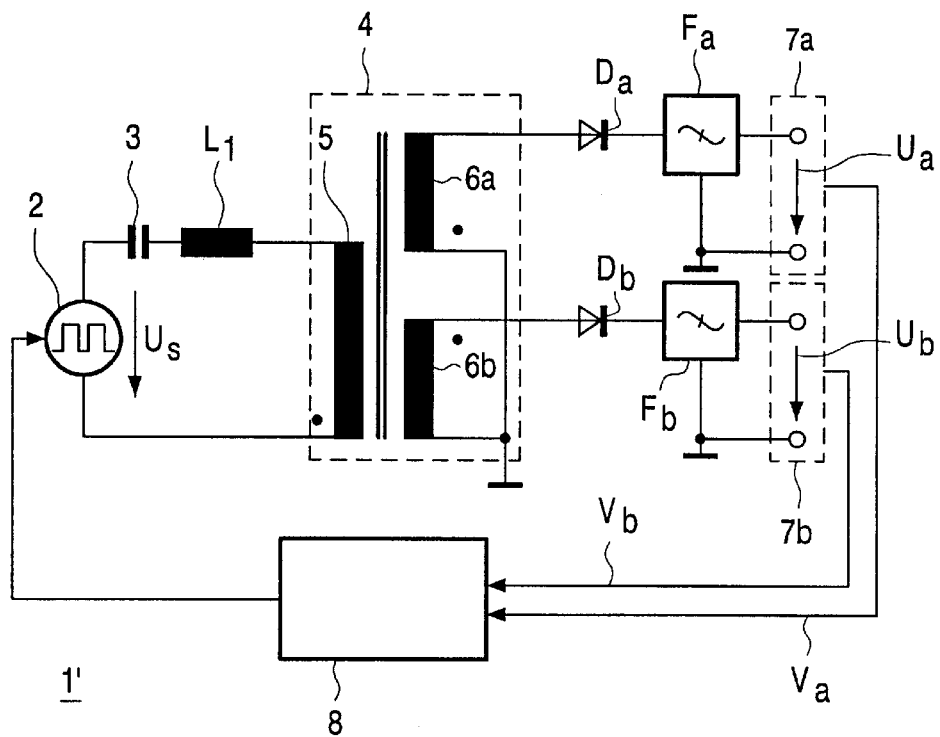
Figure 9:
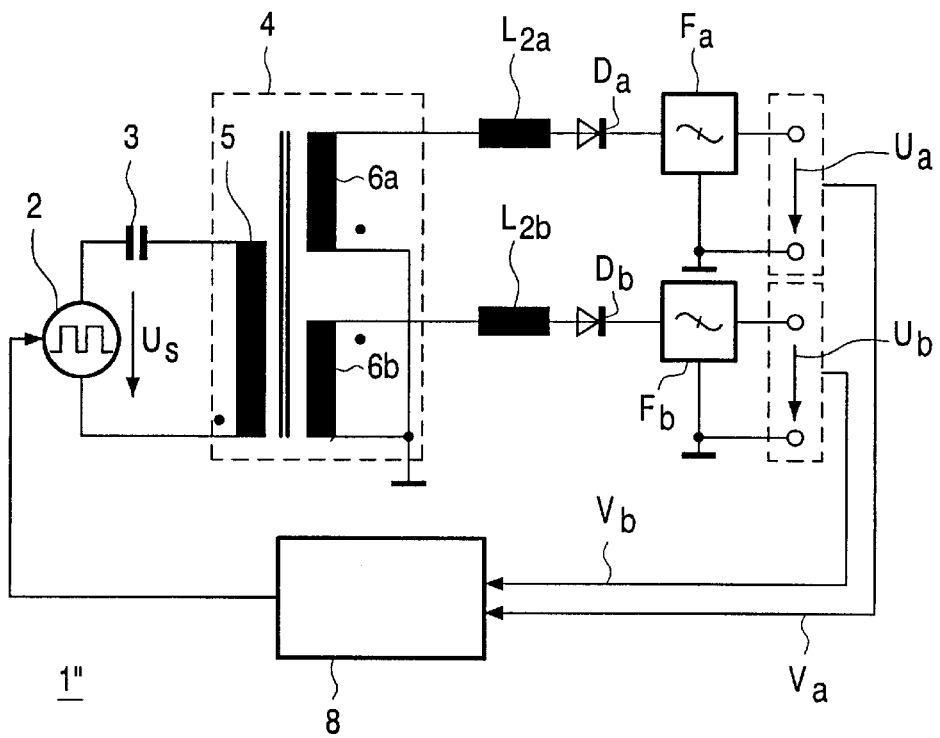

FIGS. 8 and 9 show variants of the converter 1 in FIG. 1, which are denoted by 1' and 1". In both variants the two secondary windings 6a and 6b are electrically coupled to one another; in this instance these are connected to a common ground potential. In the development of the converter 1 according to FIG. 1 the secondary windings 6a and 6b are electrically separated from one another. In FIG. 8, moreover, as a further variant an additional external inductance L1 is provided, which is arranged on the primary side of the transformer 4 between the capacitor 3 and the primary winding 5 and acts as an additional inductive resonant circuit element in addition to the inductances of the transformer 4. In the given type of transformer 4 with specific transformer inductances this additional inductance enables the resonance frequency of the converter to be adjusted. FIG. 9 shows additional external inductances L2a and L2b on the secondary side of the transformer 4. The inductance L2a is arranged between the secondary winding 6a and the diode Ta, the inductance L2b lies between the secondary winding 6b and the diode Db. These two inductances also act as additional circuit elements and can be used to adjust the desired—possibly asymmetrical—power distribution between the outputs in rating, for instance. Converter variants are obviously also possible in which additional external inductances are provided both on the primary side of the transformer 4 and on the secondary side of the transformer 4.

Figure 10:
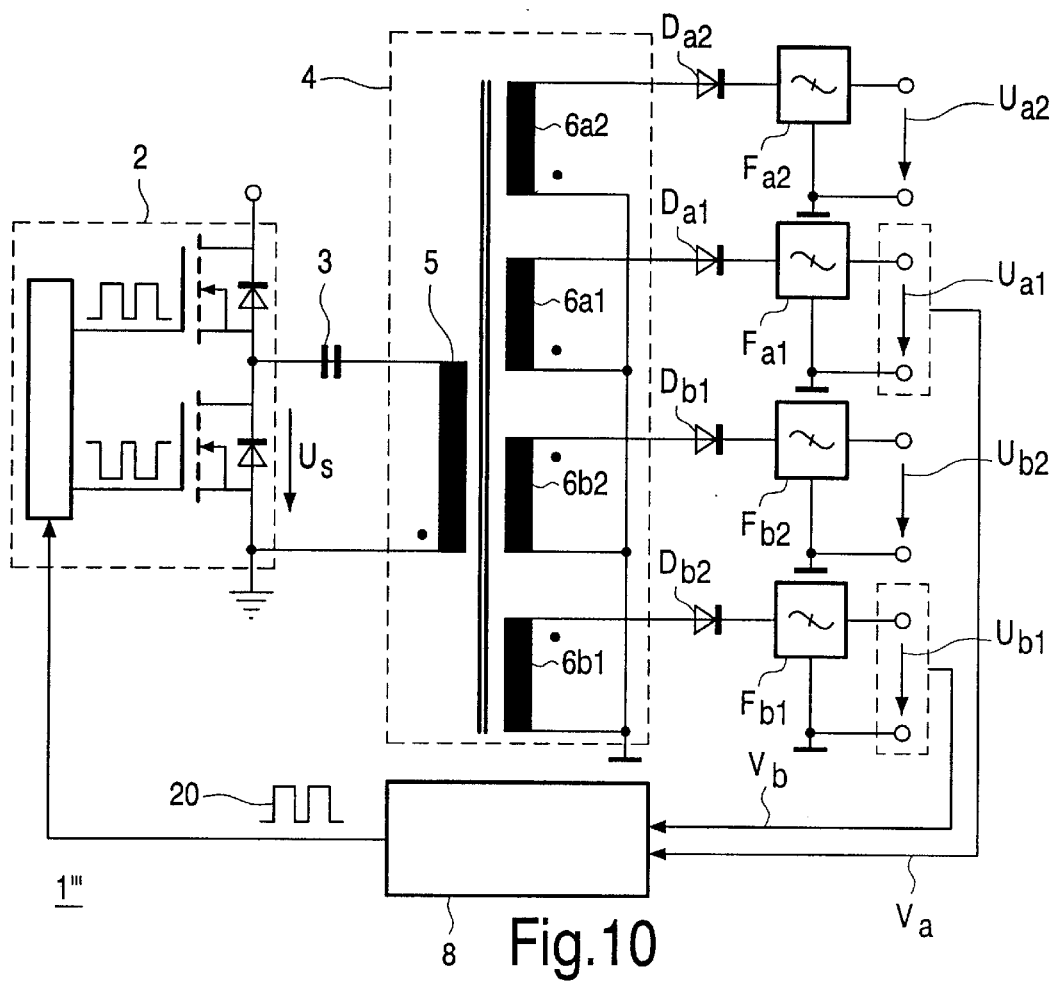

FIG. 10 shows a converter variant 1''' with a larger number of converter outputs. In this instance the converter has four converter outputs. In addition to the primary winding 5 the transformer 4 now has two groups of secondary windings with different winding direction (indicated by the letters a and b), which contain the secondary windings 6a1 and 6a2 on the one hand and the secondary windings 6b1 and 6b2 on the other. The secondary windings are connected by diodes Da1, Da2, Db1 and Db2 with output filters Fa1, Fa2, Fb1 and Fb2 to the converter outputs, which carry output voltages Ua1, Ua2, Ub1 and Ub2. The output voltages Ua1 and Ub1 are fed to the regulating circuit 8 as measured variables. The regulating circuit 8 therefore in this case analyzes two output voltages, the one output voltage Ua1 being generated by the secondary winding 6a1 from the group of secondary windings with the first winding direction. The other output voltage Ub1 fed to the regulating circuit 8 is assigned to the secondary winding 6b1 from the group of secondary windings having the opposite winding direction. Here therefore, a measured variable, i.e. output voltage, is analyzed for each of the two groups having secondary windings of different winding directions and used for regulating purposes. This represents a particularly simple and effective method of regulating the output voltages of the converter.

Figure 11:
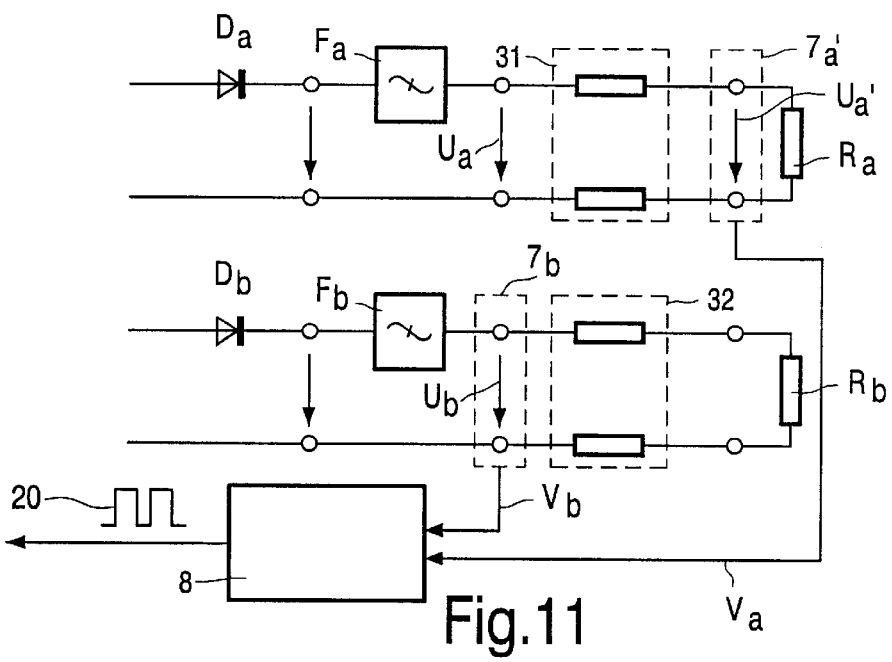
FIG. 11 shows an example of the coupling of converter outputs to the regulating circuit of the resonant, according to the invention.

FIG. 11 shows that as measured variables the regulating circuit analyzes either the actual voltages on the converter outputs or the voltages on the connected load of the converter, the latter being reduced, compared to the corresponding output voltages, owing to voltage drops on the leads between the converter and the loads. Examples of both variants are represented in FIG. 11. The converter outputs here carry the two output voltages Ua and Ub, to each of which a load Ra and a load Rb is connected. The connecting leads between the converter output supplying the output voltage Ua and the load Ra are represented here by a block 31. The connecting leads between the output of the converter supplying the output voltage Ub and the load Rb are represented by the block 32.

Figure 12:
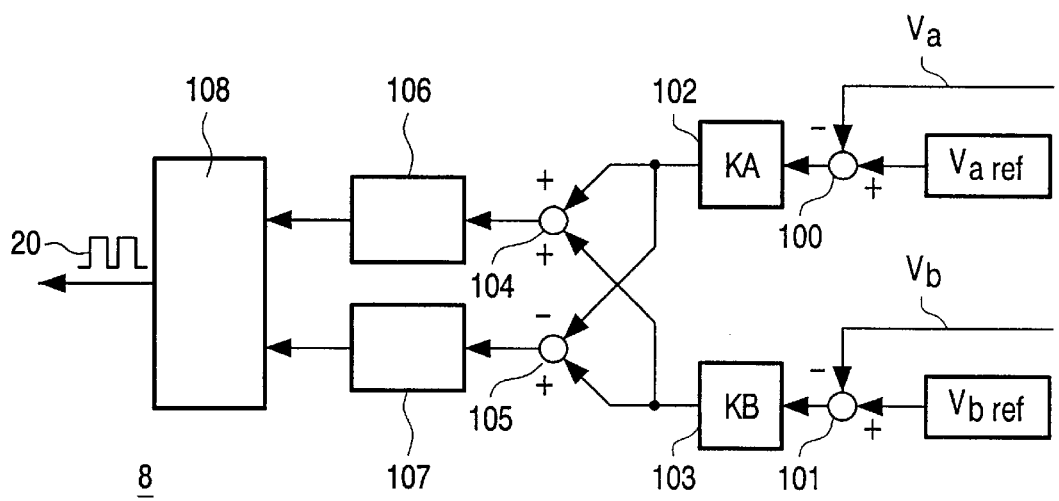
FIG. 12 shows a block diagram for a design variant of the regulating circuit of the resonant converter, according to the invention.

FIG. 12 shows an example of embodiment of the regulating circuit 8. A first measuring signal Va and a second measuring signal Vb, which correspond to output voltages Ua and Ub and Ua1 and Ub1 respectively, are fed to the two inputs of the regulating circuit. The measuring signals Va and Vb are compared with reference signals Varef and Vbref. Subtractors 100 and 101 are used in this. The subtractor 100 delivers the difference Varef-Va to a circuit block 102. The subtractor 101 delivers the difference Vbref-Vb to a circuit block 103. The circuit blocks 102 and 103 contain amplifiers and scaling circuits, so that the difference signal supplied by the subtractor 100 is multiplied by a factor KA and the difference signal supplied by the subtractor 101 by a factor KB. Here in this example of embodiment the following relationship applies:

$$kA \cdot Varef \cong kB \cdot Vbref$$

The output signals from the circuit blocks 102 and 103 are further processed by an adder 104 and a subtractor 105. The adder 104 adds the output signals from the circuit blocks 102 and 103 and delivers its output signal to a frequency controller 106, which is designed, for example, as PID controller. The difference signal delivered by the subtractor 105 is fed to a duty cycle controller 107, which is also designed, for example, as PID controller. A signal generator circuit 108 now generates the control signal 20 supplied to the inverter 2 by the regulating circuit 8, the control signal here being a pulse width modulated signal. The frequency of the signal 20, which determines the frequency of the a-c voltage Us of the resonant converter, is adjusted by the output signal of the frequency controller 106. The duty cycle of the signal 20, which determines the duty cycle of the a-c voltage Us, is adjusted by the duty cycle controller 107.

If the value of the measuring signal Va, for example, is reduced in the regulating circuit according to FIG. 12, so that Va becomes <Varef, this leads on the one hand to a reduction of the frequency set by the controller 106 and hence, according to the behavior of the resonant converter, to a tendency to increase on the part of the output voltages generated by the resonant converter. On the other hand, however, the control produced in this case also causes a reduction of the duty cycle of the signal 20 and the a-c voltage Us determined by the controller 107. This occurs, for example, in the operating state according to FIG. 6, where the power carried to the output 7a by the secondary winding 6a is increased in relation to the power carried to the output 7b by the secondary winding 6b.

If in another instance, for example, the measuring signal Vb or the corresponding output voltage Ub is reduced, this likewise leads to a reduction of the frequency of the signals 20 or the frequency of the a-c voltage Us. In this case, however, the controller 107 brings about an increase of the duty cycle of the signal 20 and the duty cycle of the a-c voltage Us, so that in this operating instance the power distribution is modified so that the power carried to the output 7b is increased in comparison to the power carried to the output 7a. The control characteristic also applies analogously to the design variants having more than two converter outputs.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A resonant converter comprising:
    multiple converter outputs;
    a transformer including a primary winding and at least two secondary windings of different winding directions, each secondary winding being electrically connected to one of said multiple converter outputs;
    at least two switching elements for chopping an input d-c voltage to yield a chopped input d-c voltage; and
    a feedback loop including a regulating circuit for regulating a frequency and a duty cycle of the chopped input d-c voltage.

2. The resonant converter of claim 1,
wherein said at least two secondary windings includes a first group of secondary windings with one or more secondary windings having a first winding direction, and a second group of secondary windings with one or more secondary windings having a second winding direction; and
wherein at least two of said at least two secondary windings are electrically separated from one another.

3. The resonant converter of claim 1,
wherein said at least two secondary windings includes a first group of secondary windings with one or more secondary windings having a first winding direction, and a second group of secondary windings with one or more secondary windings having a second winding direction; and
wherein at least two of said at least two secondary windings are electrically connected to one another.

4. The resonant converter of claim 3, wherein said at least two secondary windings are connected to a ground potential.

5. The resonant converter of claim 1, wherein a resonant frequency of the resonant converter is determined by a main inductance and a plurality of leakage inductances of said transformer and by a capacitive element.

6. The resonant converter of claim 1, further comprising at least one additional inductive element, wherein, in addition to said transformer, said at least one additional inductive element co-determines a resonant frequency of the resonant converter.

7. The resonant converter of claim 1, wherein each secondary windings of said transformer is electrically connected to one of said multiple converter outputs by way of one diode and one output filter.

8. The resonant converter of claim 1, wherein different ratios of output voltage to number of turns are provided in respect of associated secondary windings having different winding directions.

9. The resonant converter of claim 2, further comprising means for deriving a measuring signal for regulating converter output voltages from each multiple output associated with said first group of secondary windings.

10. The resonant converter of claim 3, further comprising means for deriving a measuring signal for regulating converter output voltages from each multiple output associated with said first group of secondary windings.

11. A resonant convert comprising:
an inverter operable to convert a d-c voltage into an a-c voltage;
a transformer including
a first secondary winding electrically connected to said inverter to generate a first secondary voltage as a function of the a-c voltage, and
a second secondary winding electrically connected to said inverter to generate a second secondary voltage as a function of the a-c voltage,
wherein said first secondary winding and said second secondary winding have different winding directions; and
a regulation circuit electrically connected to said first secondary winding and said second secondary winding to regulate a frequency and a duty cycle of the a-c voltage as a function of the first secondary voltage and the second secondary voltage.

12. The resonant converter of claim 11, wherein said first secondary winding and said second secondary winding are electrically separated from one another.

13. The resonant converter of claim 11, wherein said first secondary winding and said second secondary winding are electrically connected to each another.

14. The resonant converter of claim 11, wherein said first secondary winding and said second secondary winding are electrically connected to a ground potential.

15. The resonant converter of claim 11, further comprising means for establishing a resonant frequency of the resonant converter.

16. The resonant converter of claim 11, further comprising a rectifying and filtering circuit electrically connected to said first secondary winding to rectify and filter the first secondary voltage, wherein said rectifying and filtering circuit exclusively consists of a diode and a filter.

17. The resonant converter (1) of claim 11, further comprising means for rectifying and filtering the first secondary voltage.

18. The resonant converter of claim 11, wherein said a regulation circuit includes means for comparing the first secondary voltage to a first reference voltage and for comparing the second secondary voltage to a second reference voltage.

19. A resonant converter, comprising:
an inverter operable to convert a d-c voltage into an a-c voltage;
a transformer including
a first secondary winding electrically connected to said inverter to generate a first secondary voltage as a function of the a-c voltage, and
a second secondary winding electrically connected to said inverter to generate a second secondary voltage as a function of the a-c voltage,
wherein said first secondary winding and said second secondary winding have different winding directions; and
means for regulating a frequency and a duty cycle of the a-c voltage as a function of the first secondary voltage and the second secondary voltage.

* * * * *